US005101181A

United States Patent [19]

Rauscher

[11] Patent Number: 5,101,181

[45] Date of Patent: Mar. 31, 1992

[54] LOGARITHMIC-PERIODIC MICROWAVE MULTIPLEXER

[75] Inventor: Christen Rauscher, Alexandria, Va.

[73] Assignee: The United States of America as represented by the Secretary of the Navy, Washington, D.C.

[21] Appl. No.: 536,852

[22] Filed: Jun. 12, 1990

[51] Int. Cl.[5] ............ H01P 5/12; H04J 1/00

[52] U.S. Cl. ............ 333/134; 333/204; 370/123

[58] Field of Search ............ 333/126, 128, 129, 132, 333/134, 136, 204, 246; 370/69.1, 123; 343/792.5

[56] References Cited

U.S. PATENT DOCUMENTS

| | | | |
|---|---|---|---|
| 4,117,491 | 9/1978 | Hanna et al. | 343/792.5 X |
| 4,168,479 | 9/1979 | Rubin | 333/204 X |
| 4,371,853 | 2/1983 | Makimoto et al. | 333/204 |

FOREIGN PATENT DOCUMENTS

| | | | |
|---|---|---|---|
| 0090601 | 4/1989 | Japan | 333/134 |

OTHER PUBLICATIONS

Raucher, "Logarithmic-Periodic Contiguous-Channel Microwave Multiplexers", IEEE MTT-S Digest, Jun. 1989, pp. 21-24.

DuHamel et al, "Log-Periodic Transmission Line Circuits-Part I: One-Port Circuits", IEEE Trans. on Microwave The. & Tech., vol. MTT-14, No. 6, Jun. 1966, pp. 264-274.

*Primary Examiner*—Eugene R. LaRoche
*Assistant Examiner*—Seung Ham
*Attorney, Agent, or Firm*—Thomas E. McDonnell; Edward F. Miles

[57] ABSTRACT

A multiport microwave multiplexer having components which are log-periodically scaled structures is shown and described. Circuit parameter values and characteristic frequencies are determined and a first output port is linked by a constant ratio to corresponding quantities that define the response of other networks. A capacitively end-coupled channelizer filter is used for each channel of the multiplexer.

29 Claims, 7 Drawing Sheets

LOGARITHMIC-PERIODIC MICROWAVE MULTIPLEXER

BACKGROUND OF THE INVENTION

1. Field of the Invention

The present invention relates to construction and design of microwave multiplexers which may or may not have contiguous channels. In these devices, a broadband input microwave signal, through filtering techniques, is divided into a number of different narrower-bandwidth output signal components. The most challenging designs involve situations where the passbands of the output channels are contiguous, accommodating the entire input frequency band.

The design of microwave multiplexer circuits can present a particular challenge, especially if low transmission losses and high channel selectivities are to be achieved in conjunction with contiguous channel operation. These combined requirements inherently translate into significant interdependencies among individual frequency-selective segments of the multiplexer, which may result in having to account for an inconveniently large number of circuit variables simultaneously.

2. The Prior Art

The prior art in the field of antenna design has utilized log-periodic principles. These principles have, however, not been successfully applied to the design of microwave multiplexers. An article entitled "Log-Periodic Transmission Line Circuits—Part 1: One-Port Circuits," R. H. DuHamel and M. E. Armstrong published in *IEEE Transactions on Microwave Theory and Techniques,* Volume MTT-14, No. 6, June 1966, describes the use of log-periodic scaling in transmission line circuits. The DuHamel and Armstrong article is hereby incorporated by reference and made a part of applicant's disclosure.

The DuHamel article discloses a theoretical study of one-port log-periodic circuits consisting of a transmission line shunt-loaded with open-circuit transmission line stubs. The article suggests the possibility of multiport circuits, but does not provide any information or disclosure which would enable one to design such a multiport circuit. The author titled the reference article as "Part I." However, there has never been a publication of a second or further part which would describe circuits other than one-port circuits. Therefore, the literature is devoid of any disclosure of design techniques wherein log-periodic transmission line multiport circuits are disclosed. The DuHamel article at page 271 refers to PART II—Two-Port Circuits. This article, however, never materialized. Therefore, the prior art has recognized that a multiport log-period transmission line device can be built, and may be desirable. However, the art has never taught those working in the art how to achieve an operable log-periodic multiport circuit that can fulfill a practical need.

BRIEF SUMMARY OF THE INVENTION

This invention relates to a method of design and construction of multiport microwave frequency multiplexers. The principles of log-periodically scaled structures are applied to frequency filter networks having at least one input port and at least one output port. The method of this invention achieves its greatest design advantage in design of contiguous channel microwave multiplexers where it is desired to place the output bands as close together as possible.

In the design method of this invention, circuit parameter values and characteristic frequencies are determined and a first output port response is linked by a constant ratio to corresponding quantities that define the response of other output ports. In construction of a workable multiport multiplexer of this invention, each output port constitutes the output port of a channelizer filter. More particularly, the channelizer filter selected is the type known as a capacitively end-coupled transmission line filter. This filter is used in this circuit because it exhibits driving-point impedance characteristics that are similar to those of a series resonant circuit (R,L,C in series). Channelizer filters provide high driving-point impedances at stop-band frequencies, and close to system-match impedances at in-band frequencies. In this disclosure, the capacitively end-coupled channelizer filter is used in the design of the multichannel multiplexer, but other filters having series resonant or similar driving-point impedance characteristics can be used.

The multiport microwave frequency multiplexer of this invention also includes low-pass filter structures located between the input port, the first output port, and between all other output ports. These low-pass filter segments help to confine signal components to the section of the multiplexer circuit between input port and designated channelizer filter and help direct the components to the designated output port while incurring minimal signal attenuation. In the preferred embodiment, at least one transmission line stub is provided in each of the low-pass filter structures.

In construction of the multiplexer capacitatively end coupled transmission line filters, it is desirable to move unwanted parasitic passbands (satellite bands) to higher frequencies which are further away from the principal passband of the transmission line filter. This shift of the parasitic passbands is accomplished by means of special transmission line resonators. These resonators comprise cascade combinations of low- and high-impedance transmission line segments. The preferred embodiment of this structure, when implemented on a circuit board, appears as two wide transmission line sections separated by a narrow section. Applicant has coined the term "barbells" to describe this type of transmission line resonator.

Since a log-periodically scaled structure is, in principle, an infinitely large circuit, it is necessary to construct boundaries for the region of the circuit of interest. Applicant teaches the use of an equivalent substitution network at the input to the log-periodic structure and a termination network at the far end. The input equivalent substitution network is a two-port network. The equivalent termination network at the far-end or low-frequency side of the structure is a truncation one-port substitution network as shown in FIG. 2. This network may simply consist of an open circuit as shown generally in FIGS. 5 and 5A.

It is also possible to provide feedback from the output ports back to the other nodes in a multiplexer unit. This is exemplified in FIG. 6*a* where a feedback circuit $D_n$ is provided between the output circuits $B_n$ and the trunk line filter $A_n$. Similarly, by example, feedback can also be provided between each output port and the input port of the entire log-periodic filter structure. This is shown in FIG. 6*b*. The cascade connection of filter sections $A_n$ and $C_n$ (FIGS. 1,6) constitutes a trunk feeder network. These cascaded filter sections adhere to the same log-periodic scaling as the rest of the multiplexer components do.

Multiport microwave frequency multiplexers designed in accordance with the principles of this invention comprise steps of selecting output frequency bands, the number of frequency bands, the components for each frequency band and lead-in and truncation networks, and log-periodically scaling frequency sensitive components to form a scaled structure. Designs in accordance with the principles of this invention also comprise the use of capacitively end-coupled transmission line channelizer filters in each multiplexer output subcircuit, placement of low-pass filter sections between each subcircuit, construction of transmission line resonator sections contained in each channelizer filter to shift unwanted parasitic passbands away from the main channel passband frequency, and utilizing a channelizer filter in each multiplexer output circuit whose driving point impedance responses move from high impedance at stop-band frequencies and to the near system-match impedance at in-band frequencies. The foregoing and other objects, features and advantages of the present invention will become more apparent in light of the foregoing and detailed description of the preferred embodiments thereof as illustrated in the accompanying drawings.

Although the invention has been shown and described with respect to the best mode embodiment thereof, it should be understood by those skilled in the art that the foregoing and various other changes, omissions and deletions in the form and detail thereof may be made therein without departing from the spirit and scope of this invention.

BRIEF DESCRIPTION OF THE DRAWINGS

In FIG. 5(*a*) there is shown a drawing of the transmission line segments of the circuit board of FIG. 5. The drawing of FIG. 5(*a*) does not include capacitive structures visible in FIG. 5.

In FIG. 6(*b*) there is shown a multiplexer with feedback from each output port back to the network input port.

DETAILED DESCRIPTION OF THE PREFERRED EMBODIMENT

Figure 1:
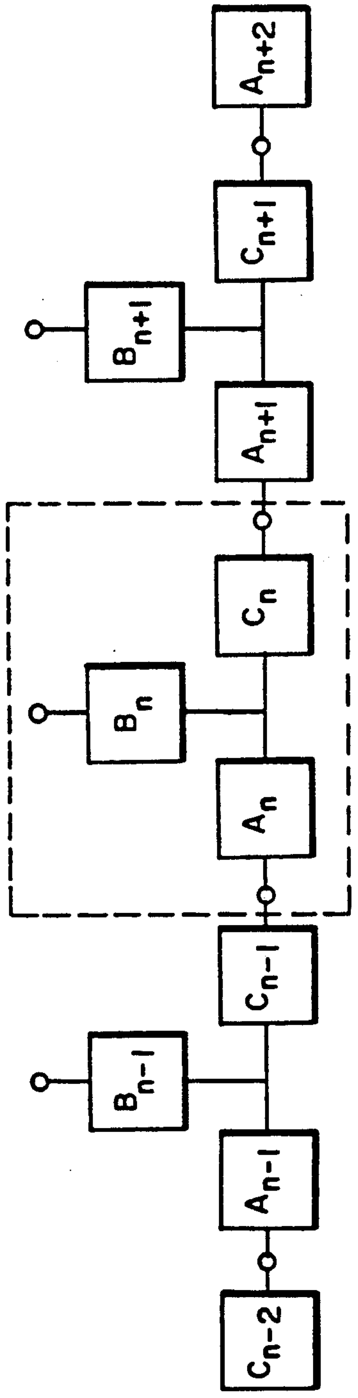
In FIG. 1 there is shown a block diagram of a cascade connection of logarithmic-periodically scaled three-segment multiplexer cells.
Figure 10:
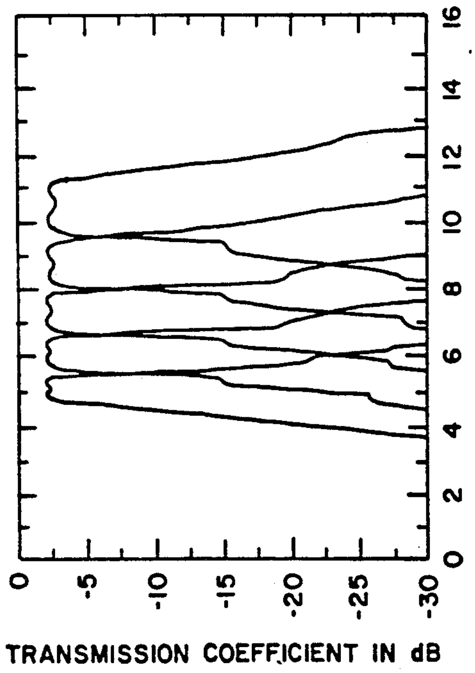
In FIG. 10 there is shown the five-channel band pass characteristics of the multiplexer with 20% fractional bandwidth channels as constructed in accordance with this invention.

A logarithmic-periodic multiplexer circuit in its pure form comprises an infinite assembly of systematically scaled network segments, with each of these associated with a different channel which may be used or dummy. This is illustrated in FIG. 1 where the segments are assumed to be three-port networks which may be further decomposed into two-port sections $A_n$, $B_n$ and $C_n$. The B-sections represent channelizing filters whose main responsibility is to define the individual channel responses. The other sections A and C share in this responsibility, but are primarily tasked with signal distribution and impedance transformation. According to logarithmic-periodic principles, the circuit parameter values and characteristic frequencies defining a particular composite segment are rigidly linked to the corresponding quantities of neighboring segments through a logarithmic-periodic scaling factor. For contiguous-band multiplexers, this factor is equal to unity plus the specified fractional channel bandwidth. A scale factor of 1.2 is generally shown in FIG. 10. Here, the bandwidth is equal to $1.2-1{:}1\times 10$, or 20%. The crossover points are at approximately 3 dB low voltage channel passband transmission. The scale factor in accordance with this invention can therefore be arrived at in an extremely simple consideration of the proposed bandwidth and center frequencies. The scale factor will, however, differ from the one underlying FIG. 10 when output passbands are not selected to be contiguous.

Prior to the invention, the design of conventional low-loss, highly selective microwave multiplexers of the contiguous-channel type has been a very different task. The low-loss requirement, when combined with the contiguous-channel requirement, results in strong coupling existing between the various sections of the multiplexer, which denies the designer the convenience of being able to optimize one frequency selective subnetwork at a time. In contiguous channel designs, the entire circuit must be optimized as a whole, involving a large and sometimes overwhelming number of design parameters to be considered simultaneously. However, by application of logarithmic periodicity as taught in this invention, the entire circuit is in essence defined once a single output channel has been designed, thereby limiting the design variables to those of that single output channel. The logarithmic periodic rule of this invention thus automatically provides simultaneous optimization of the entire multiplexer unit.

Figure 5:
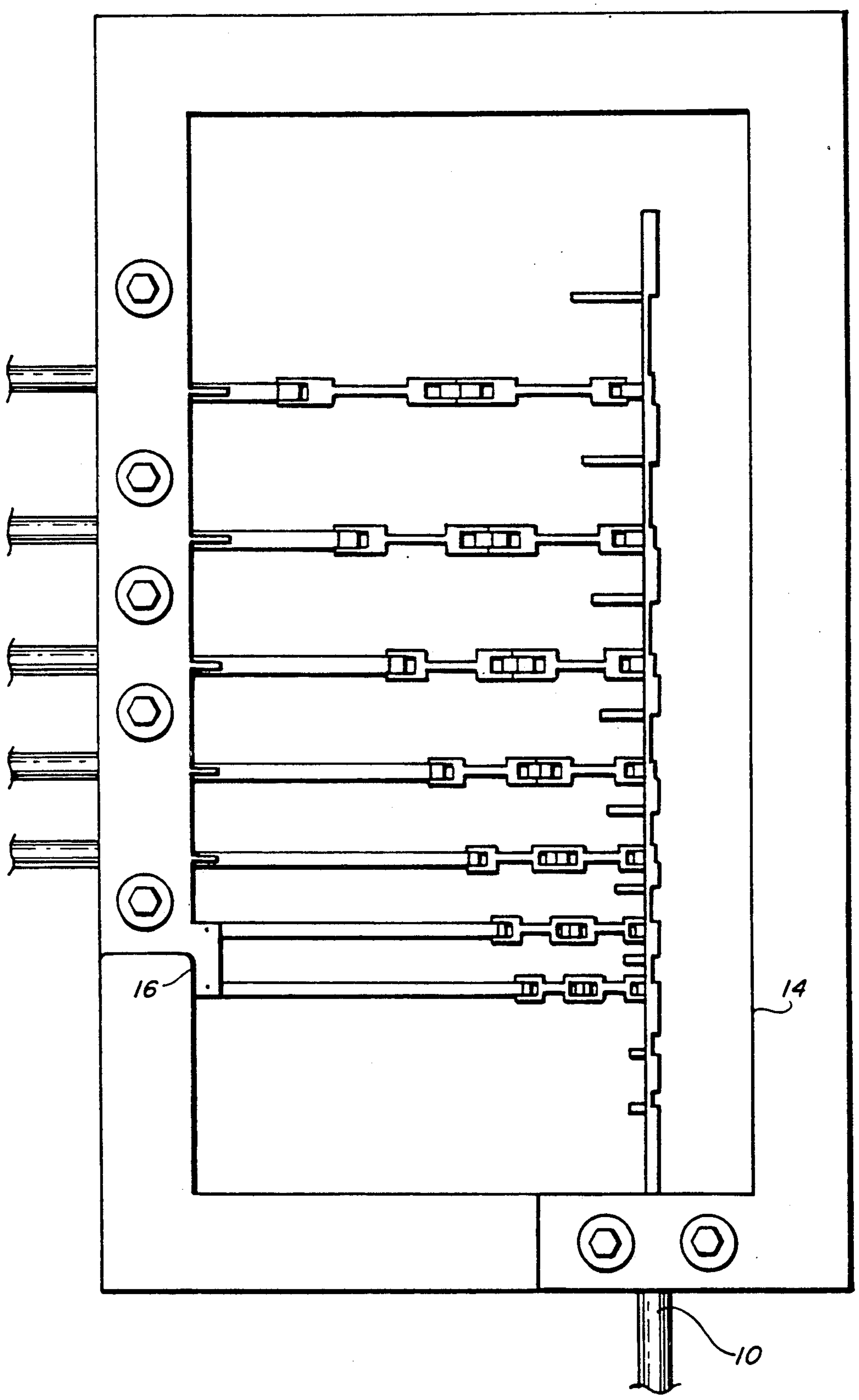
In FIG. 5 there is an elevational view of a logarithmic-periodic multiplexer constructed on a circuit board for use with a ground plane and in accordance with the principles of this invention.
Figure 5A:
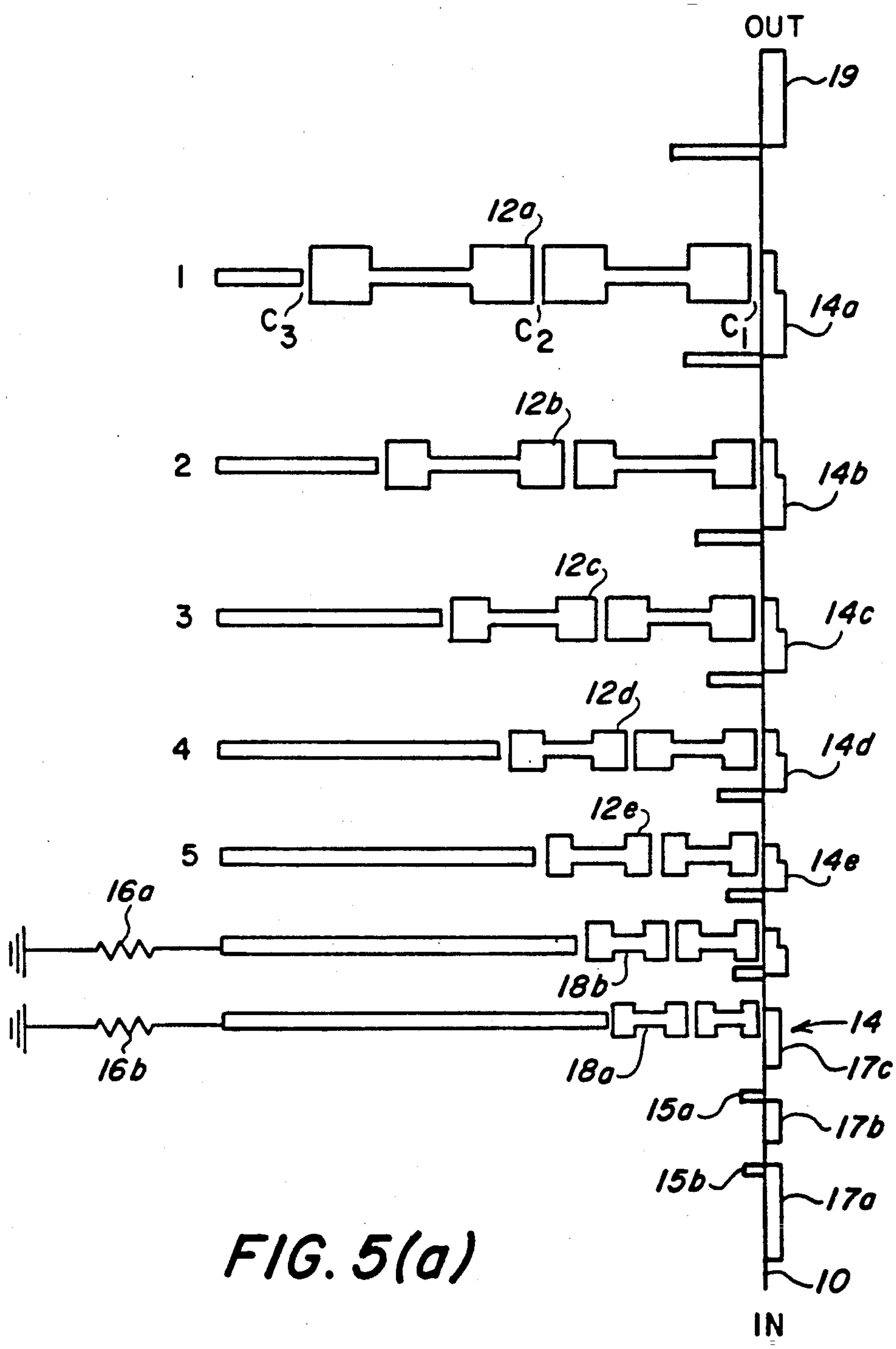

In the multiplexer of this invention, the input signal is always introduced in a manner that allows the signal to propagate in the direction of segments with decreasing characteristic frequencies (i.e. high frequency to low frequency). If the multiplexer is implemented with the help of distributed circuit elements, the input port of the multiplexer becomes geometrically defined by the apex of the structure on which the segment-converge as the channel frequencies increase. This phenomena can be best seen in FIG. 5 and the sketch of FIG. 5(*a*). From the input port, the signal is guided, in effect, by a nonuniform, reactively loaded transmission line defined by the cascade of highest-frequency segments with resistively terminated channelizing filters all operating below cutoff. This line may also be referred to as the trunk transmission line which includes low-pass filter section between each channelizer section connected to an output port. The input port 10 is shown in the transmission line circuit board of FIGS. 5 and 5(*a*). The channelizing filters 12(*a*)-(*e*) are connected to output ports 5 through 1, respectively, as shown in FIG. 5. The low-pass filter networks associated with the trunk line and each channelizer filter are shown as 14(*a*)-14(*e*). The trunk line is generally designated as 14.

The signal propagates along the trunk feeder 14 until it reaches the filter (14(*a*)-(*e*)) whose passband encompasses the frequency of the signal. At that point it gets channeled off to an output port (5-1) by means of a channelizer filter 12(*a*)-(*e*). The channeling-off process is assisted by the predominantly reactive properties of the remaining lower-frequency portion of the structure, i.e. all channelizer filters and interlinking low-pass trunk feeder sections that belong to channels with passband frequencies below the ones to be channeled off.

The selection of a suitable type of filter for the channelizing B sections constitutes probably the most critical design decision in construction of a microwave multiplexer in accordance with this invention. If a parallel-coupled-line band-pass filter with open-circuit resonator ends is used in a logarithmic-periodic structure in accordance with this invention, it simply will not work. This implementation incorporates a serious flaw. The driving-point impedance characteristics of the selected parallel-coupled line filter exhibits shunting series-type resonances in the vicinity of their band edges. The effect of these resonances is to destructively interfere, on a frequency-selective basis, with an incident signal proceeding along the multiplexer structure toward its assigned designation (its output channel). In contiguous-band situations, this behaviour of an otherwise useful circuit proves unacceptable. In non-contiguous band situations, this type of filter may be used where there is sufficient band separation to eliminate destructive interference with the signal proceeding along the multiplexer structure (the trunk feeder 14 as shown in FIG. 5(*a*)).

It has also been found that the majority of common microstrip-compatible filter structures display troublesome resonance behaviour which becomes critical in contiguous-band situations. Resonances of one kind or another, are, of course necessary, as they are instrumental in producing sharp filter transition regions.

Figure 12A:
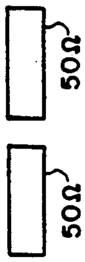
In FIG. 12*a* there is shown a conventional uniform transmission line.
Figure 12B:
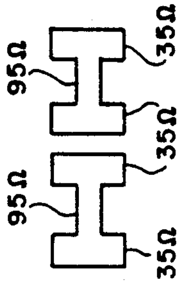
In FIG. 12*b* there is shown a non-uniform transmission that partially aggregates the capacitance and inductance.

In this invention, applicant uses the capacitively end-coupled strip resonator filter. The only drawback with this type of filter is that it produces unwanted parasitic passbands or satellite bands in the vicinity of twice the band center frequency of the primary passband. This imposes a fairly restrictive constraint on frequency range coverage in wideband multiplexer applications. As seen in FIG. 12, in this invention, applicant has overcome the unwanted parasitic passband problem by substituting for constant-characteristic-impedance transmission line resonators ones consisting of barbell combinations of three shorter transmission line segments that comprise a low-high-low characteristic impedance profile. The barbell configurations are shown in FIG. 5(*a*) as strip resonator filters 12(*a*)-(*e*). Each filter is implemented with two barbell strip resonators. Each resonator has a low-characteristic-impedance line at its beginning, a high-impedance line in the center and a low-impedance line at its end. This arrangement moves the closest-in parasitic passband to a frequency around three times the principal passband center frequency. Any remaining conflict may be dealt with by assigning low-pass or quasi-low pass properties to the associated A and C sections within the multiplexer array, thus preventing possible stray components of the incident signal from inadvertently reaching a lower-frequency filter with a commensurate parasitic passband.

The barbell structure is constructed by selecting the center strip line to have the highest realizable impedance, and each of the end sections to have the lowest realizable impedance. The actual selection process can be carried out with the aid of a computer to simulate the affect of barbell changes on the shift of the parasitic frequency band produced by the capacitively end-coupled strip resonator filter while maintaining desired characteristics for the principal passband. By going from continuously distributed capacitance and inductance in the uniform impedance lines of FIGS. 12*a* to the discontinuous barbell structure of 12*b*, the effect approaches that of lumped elements, and thus the parasitic frequency moves out.

Figure 3:
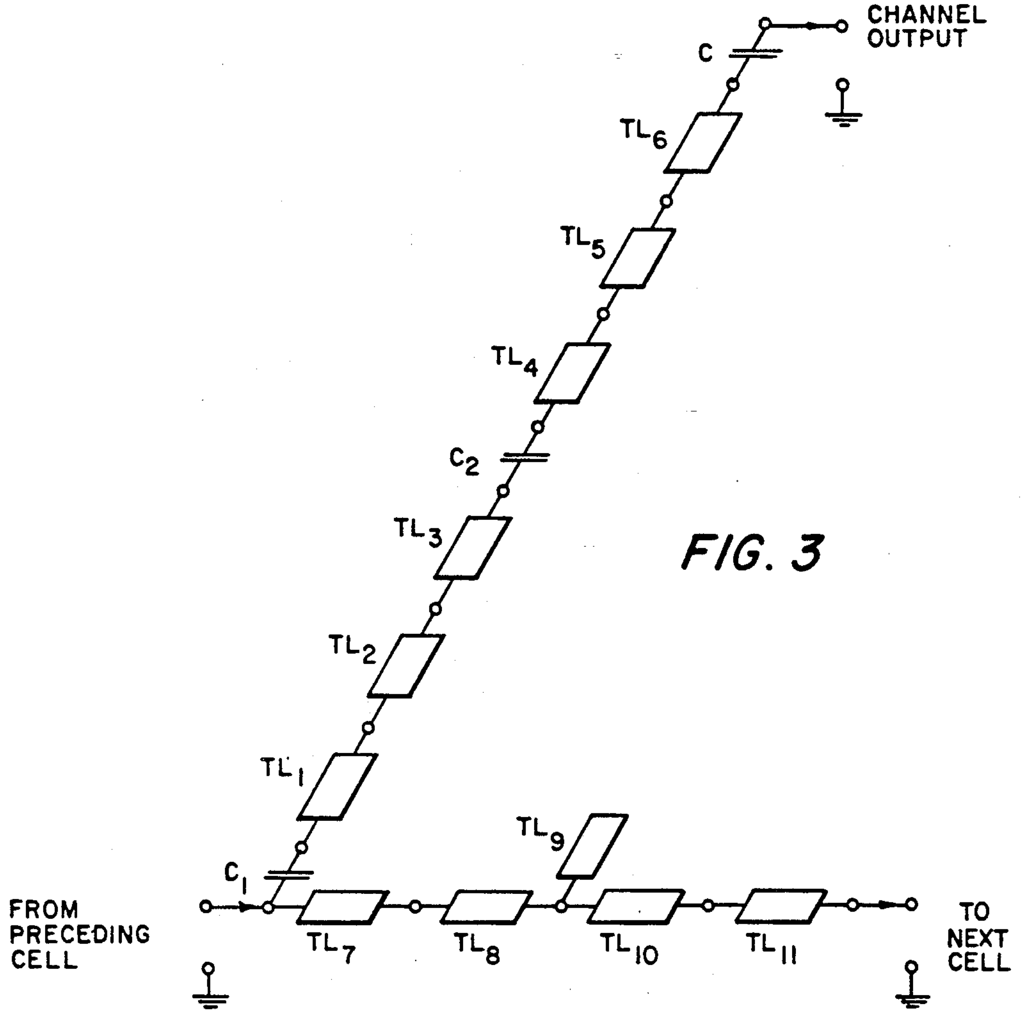
In FIG. 3 there is shown a schematic diagram of one cell of the logarithmic-periodic multiplexer of this invention.
Figure 4:
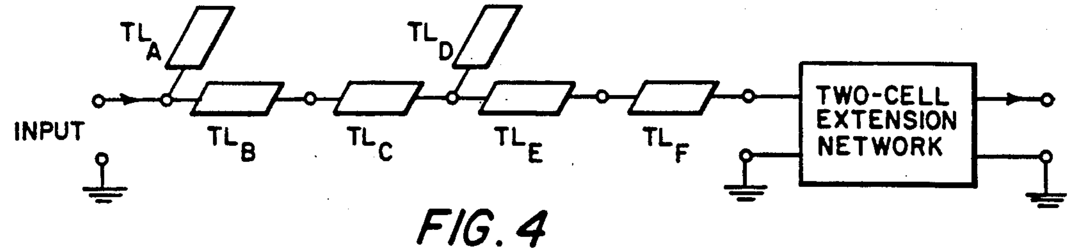
In FIG. 4 there is shown a block diagram of a lead-in substitution circuit which includes an extension of the principal logarithmic-periodic multiplexer structure with two internally terminated cells.
Figure 7:
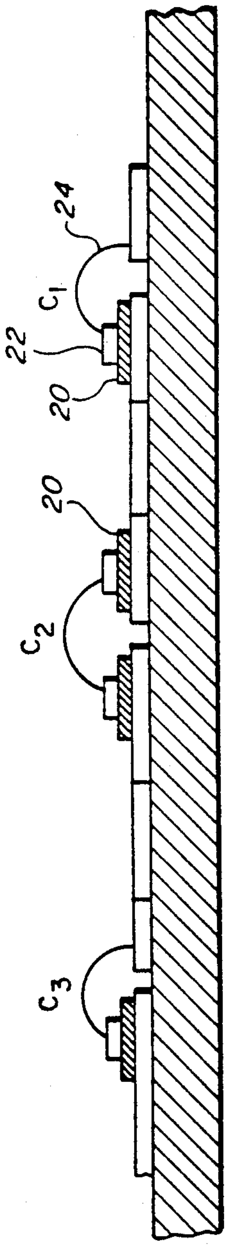
In FIG. 7 there is shown a cross-section view of a microstrip capacitively end-coupled filter structure which is shown in the photograph of FIG. 5.
Figure 8:
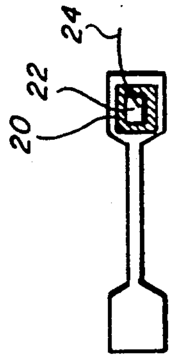
In FIG. 8 there is shown a top view of a single barbell resonator depicted in FIGS. 5, 5(*a*), 6 and 7 where the capacitor is shown placed on the top of one end of the barbell.

In construction of the capacitively end-coupled strip resonator filter, it is required that the structure have capacitances C1, C2 and C3 as depicted in FIG. 5(*a*) and also in FIG. 3. It is however critical that the value of the capacitance C1-3 be controlled within narrow limits. In the device shown in FIG. 5, it was found necessary to provide better control over the value of the capacitor C1-3 then was possible with mere etching of a gap between filter resonator sections. Therefore, the actual circuit was constructed with a capacitor consisting of a dielectric 20 (see FIG. 7) and a conductive plate 22 connected to a wire 24 which bridges the gap between the strip resonator elements. A top view of this structure is depicted in FIG. 8 where the dielectric 20 is shown with a conductive plate 22 on top of it and connected to wire 24.

Figure 2:
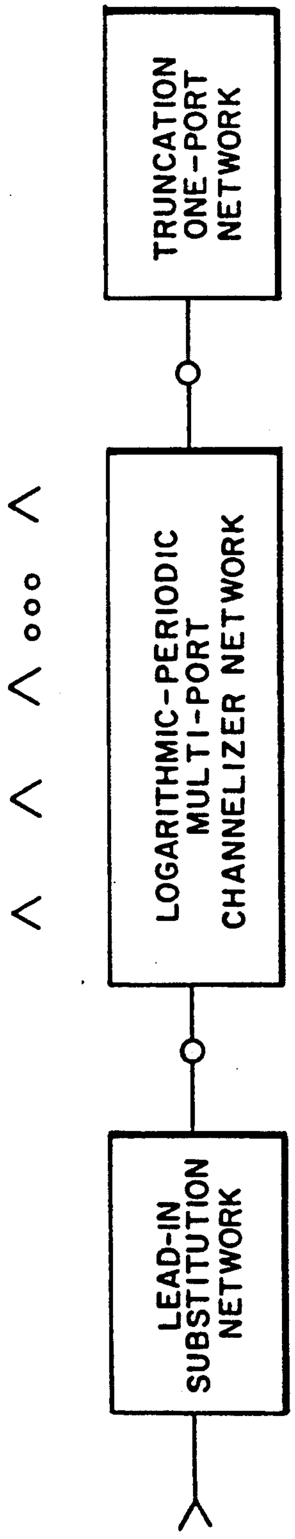
In FIG. 2 there is shown a generalized block diagram of a logarithmic-periodic multiplexer circuit including lead-in substitution and truncation networks.

To physically realize the multiplexer of this invention, the logarithmic-periodic structure, which theoretically involves an infinite number of segments, must be bounded in some reasonable fashion. This can be achieved by allowing all segments not directly associated with designated output channels to be represented by appropriately chosen equivalent substitution networks as shown in FIG. 2. One of these substitutions is for the input side of the multiplexer where the converging infinite cascade of dispensable high-frequency segments is replaced by a two-port equivalent lead-in circuit as shown in FIGS. 5, 5(*a*) and 4. By use of numerical-based approximation and synthesis techniques, the circuit is designed to mimic the composite characteristics of the deleted portion of the original infinite structure. A substitution circuit may also contain a continuation of the logarithmic-periodic structure by one or two additional segments with respective channelizing filters terminated in dummy loads. Such dummy loads are shown in FIGS. 5 and 5(*a*) as the 50 ohm loads 16*a*, 16*b* terminating two additional filter sections 18(*a*) and 18(*b*). It should be noted that the two additional filter sections 18(*a*) and (*b*) are also logarithmically scaled as are the filter sections 12(*a*)-(*e*) which feed output ports (1)-(5).

An equivalent one-port substitution circuit is used to replace the diverging array of segments beyond the lowest frequency channel of interest, and to emulate for the core portion of the multiplexer the truncated portion of the array extended toward infinity. This equivalent circuit in FIG. 5(*a*) is a mere open circuit (19).

The accuracy with which the substitution networks simulate the deleted subarrays is generally not critical. Deviations from ideality will generate a non-logarithmic-periodic ripple superimposed on the otherwise purely logarithmic-periodic behavior of the frequency response of the channels.

The multiplexer shown in FIG. 5 is constructed in accordance with the principles of this invention. A 5-channel contiguous-band multiplexer was designed for microstrip implementation on a 0.25-mm-thick fiberglass reinforced teflon substrate. The hardware realization of this circuit is shown in FIG. 5. The B-section channelizing filter consists of capacitively end-coupled barbell resonators as described above. Two such resonators are used in each B section filter channel to achieve channel response with 20% percent fractional bandwidths and double-tuned passbands.

The small coupling capacitors between each strip section were made out of copper-clad 0.125-mm-thick fiberglass reinforced teflon.

Each C section (FIG. 1, FIG. 6) comprises a low-pass cascade connection of four transmission line segments and an open ended stub, see 14(*a*)-(*e*), FIG. 5(*a*). No A sections were used in the context of this discussion of the multiplexer of FIGS. 5 and 5(*a*).

The lead-end two-port substitution network is composed of various cascaded transmission lines and stubs and a two-segment extension of the logarithmic-periodic structure. This is shown in FIG. 5(*a*) as reference numerals 18(*a*),(*b*) and the 50 ohm loads 16(*a*), (*b*). The cascaded transmission lines are depicted generally as 17(*a*)-(*c*) and stubs 15(*a*), (*b*). The extension relies on the 50 ohm loads 16(*a*) and (*b*) to properly terminate the respective band-pass filters. The low-frequency truncation network was omitted in order to demonstrate the insensitivity of the overall performance characteristics to such an abrupt termination of the array. Improved performance, eliminating the non log-periodic ripple, could be obtained by providing one or more lower-frequency extensions of the logarithmic-periodic structure used with the output ports.

FIG. 10 shows the measured performance of the multiplexer circuit of FIGS. 5 and 5(*a*). The effect of the low-frequency substitution network deletion is seen as a slight perturbation of the response of the last channel (lowest frequency channel).

In this invention, the logarithmic-periodic principle developed for wideband antenna purposes is put to use in the design of a microwave multiplexer circuit. The approach, which is applicable to both contiguous-band and non-contiguous-band situations distinguishes itself by its ability to cope with almost any number of channels, while requiring only a minimum set of design variables. This design approach can also be used to accommodate specific bandwidth requirements. The invention is not limited to contiguous-band multiplexers having a specified fractional channel bandwidth.

Figure 9:
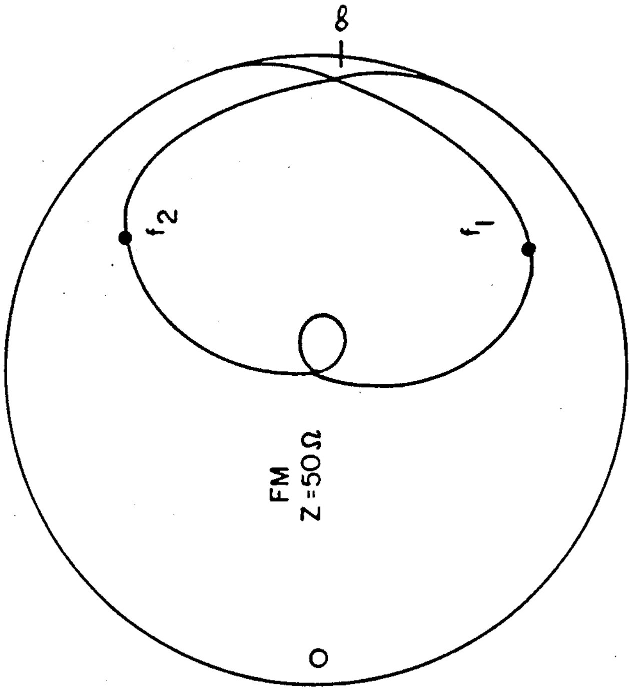
In FIG. 9 there is shown a reflection coefficient plane plot of the driving-point impedance of a capacitively end-coupled transmission line filter which is used with each output port of the preferred embodiment of this invention. This is a series resonant-type driving point impedance plot.
Figure 11:
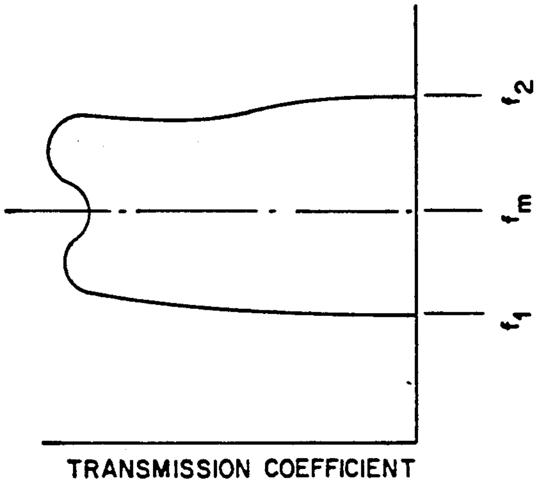
In FIG. 11 there is shown a single channel frequency characteristic which coincides with the reflection coefficient plot of FIG. 9.

In FIGS. 9 and 11, there is shown a typical plot of the channelizer filter driving-point impedance response in the reflection coefficient plane which is necessary in order to provide a channelizer filter for the B section of a multiplexer in accordance with this invention. The capacitively end-coupled transmission line filter as depicted in FIG. 9 provides for high impedance values at off-band frequencies, and for nearly-matched-to-50Ω conditions at the mid-band frequencies. The location of the frequencies $f_m$, $f_1$ and $f_2$ are depicted in FIG. 11 which shows the frequency versus transmission coefficient of the channel whose driving-point impedance has been mapped on the reflection coefficient plane of FIG. 9. The capacitively end-coupled channelizer filter was selected for this application because it was the only microstrip filter which provides the quasi-series-resonant circuit characteristic shown in FIG. 9. This was necessary in order to provide high impedance at stop-band frequencies which prevents the trunk feeder from being unduly loaded through the presence of channelizer filters operating at frequencies that are out-of-band for these filters.

In this invention, the branch filters B are tasked with providing most, but not all of the frequency selectivity. They are typically either band-pass or high-pass filters with associated bandwidths and characteristic frequencies (such as cut-off and band-center frequencies, depending on the type of filter). Corresponding characteristic frequencies change from one multiplexer cell to the next by the same logarithmic-periodic scaling factor. This factor in the circuit shown is 1.2 which is for a 20% fractional bandwidth where the bands are contiguous. The logarithmic-periodic scaling factor is a free design variable in the design of multiplexers in accordance with this invention. In the case of a contiguous channel multiplexer, the factor is equal to unity plus the specified fractional bandwidth. All frequency-dependent circuit element values (such as transmission line lengths, capacitances, inductances, etc.) in each cell are scaled by the same factor from one cell to the next so that the impedances and scattering parameters from one cell to the next remain identical in value when evaluated, respectively, at reference frequencies related to each other by the logarithmic-periodic scaling factor.

It is an object of this invention to provide that all cells in the logarithmic-periodic structure have identical topologies with circuit element values rigidly linked to one another from cell to cell through the fixed scaling factor. Once one cell is defined, essentially the entire multiplexer circuit is defined. A small set of parameters pertaining to a specific cell defines the whole circuit, independent of the number of channels involved. This is particularly valuable when dealing with large numbers of channels, because logarithmic periodicity automatically guarantees broadband performance and exact frequency scaling of the equal-percentage-bandwidth channel responses.

Figures 6A, 6B:
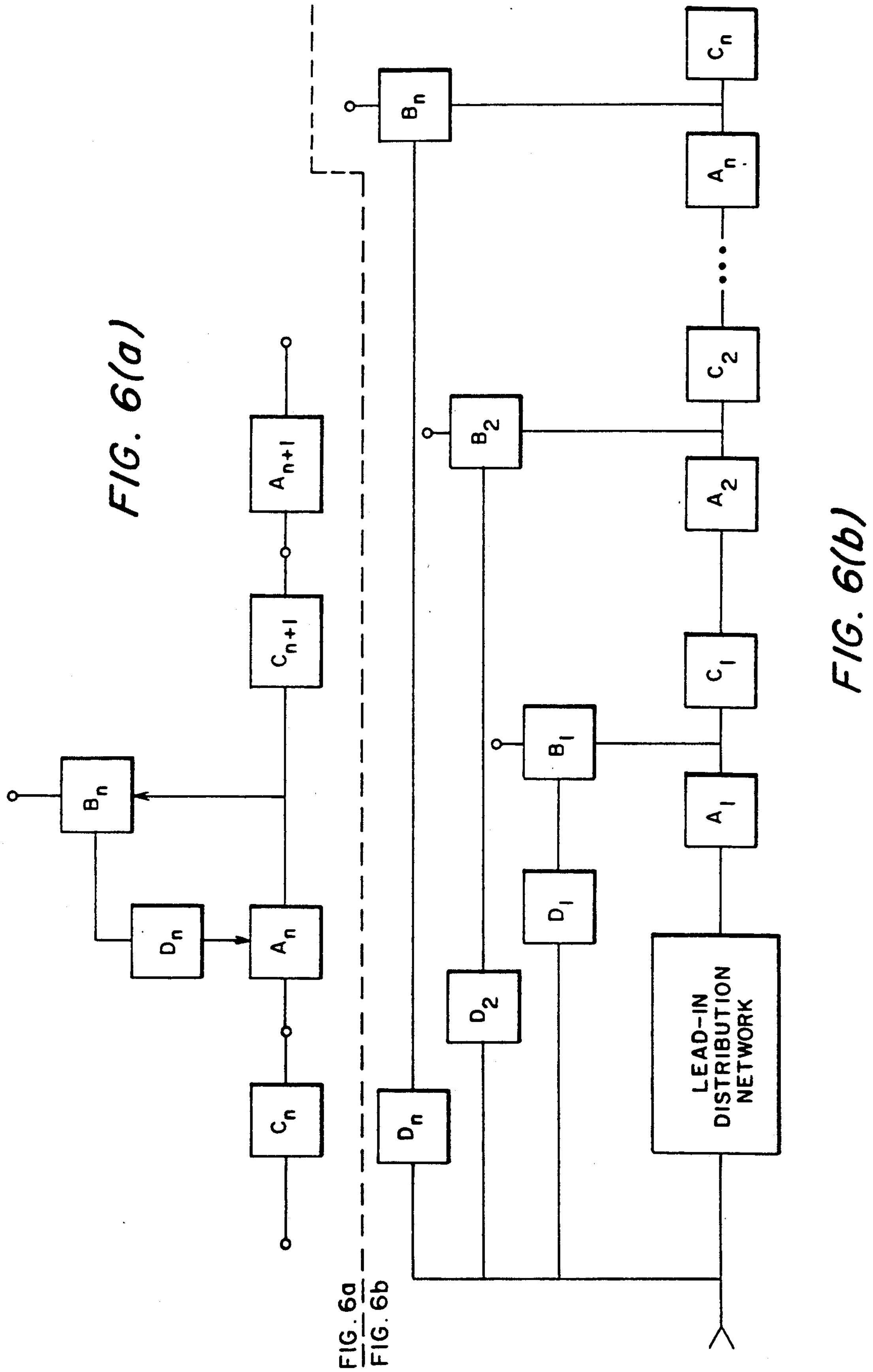
In FIG. 6(*a*) there is shown a multiplexer cell having feedback to a node in the multiplexer cell.

Any structure that meets the logarithmic periodicity requirement of this invention including different realizations for the branch filter and the trunk network segments and involving both lumped and distributed circuit elements, falls within the scope of this invention. Alternative structures which may be used with this invention include structures that do not meet all of the criteria for true logarithmic periodicity, but which may be termed quasi-logarithmic-periodic by exhibiting approximately logarithmic-periodic characteristics within a limited frequency band. An example of such a structure is one that utilizes parallel-coupled-line filters with short-circuited resonator ends. Such a multiplexer will not operate at low frequencies due to shunting inductances of the filters, but at frequencies close to the passband of these filters, satisfactory quasi-logarithmic-periodic behavior is achievable. As shown in FIGS. 6(*a*) and 6(*b*), actual implementations of the logarithmic periodicity of this invention may also include feedback elements. There may be feedback from channelizer networks to nodes in the trunk feeder network as shown in FIG. 6(*a*), or feedback all the way to the input of the network as shown in FIG. 6(*b*). The circuit may also include active circuit elements and devices which are scaled in accordance with the logarithmic-periodic principle of this invention.

The invention is further understood from the following:

I claim:

1. A multiport microwave frequency multiplexer comprising:
- an input port;
- at least two output ports;
- a first group of frequency sensitive components connecting said input port and said output ports, said frequency sensitive components forming a log-periodically scaled structure; and
- at least two low-pass filter structures being located between said input port and said at least two output ports.

2. The multiplexer of claim 1 wherein there is at least one transmission line stub in each of said low-pass filter structures.

3. The multiplexer of claim 1 wherein said low-pass filter structure comprises a second group of frequency sensitive components which are each log-periodic scaled functions of other low-pass filter structures.

4. The multiplexer of claim 3 wherein said low-pass filter structure comprises frequency selective components which are log-periodically scaled functions of output-port frequency sensitive components.

5. The multiplexer of claim 1 further comprising equivalent substitution network means for simulating omitted segments of the log-periodically scaled structure at its input.

6. The multiplexer of claim 5 wherein said equivalent substitution network means comprises a two-port network.

7. The multiplexer of claim 1 further comprising equivalent substitution network means for simulating segments of the log-periodically scaled structure at a termination.

8. The multiplexer of claim 1 further comprising feedback circuitry for feeding signals from said output ports back to other ports in the multiplexer.

9. The multiplexer of claim 1 further comprising feedback circuitry connected between said output ports and said input port.

10. The multiplexer of claim 1 further comprising a trunk feeder network connected to at least one channelized filter, said channelized filter being connected to respective ones of said output ports, said trunk feeder comprising a cascade connection of filter sections, and said filter sections comprising scaled log-periodic functions of each other.

11. The multiplexer of claim 1 further comprising a trunk feeder network for distributing input port signals of the multiplexer to frequency-selective subcircuits that define each output frequency band, and wherein said trunk feeder network comprises a cascade of log-periodic filter elements.

12. The multiplexer of claim 1 wherein each of said output ports is connected to a channelizer filter including one output port having series-resonant-type driving-point impedance characteristics in the vicinity of channel passband frequencies.

13. The multiplexer of claim 1 wherein each of said output ports comprises a port of a circuit comprising a capacitively end-coupled transmission line channelizer filter.

14. The multiplexer of claim 13 wherein said capacitively end-coupled transmission line filter includes at least one transmission line resonator section.

15. The multiplexer of claim 13 wherein said capacitively end-coupled transmission line filter further comprises a means for moving unwanted parasitic passbands to higher frequencies away from the principal passband of said transmission line filter.

16. The multiplexer of claim 14 wherein said transmission line resonator section comprises a low-impedance input section, a high-impedance center section, and a low-impedance output section.

17. The multiplexer of claim 14 wherein said transmission line resonator section comprises a low-high-low characteristic impedance profile.

18. The multiplexer of claim 15 wherein there are two transmission line resonator sections.

19. A multiport microwave frequency multiplexer comprising:
- an input port;
- at least two output ports;
- frequency sensitive components connecting said input port and said output ports, said frequency sensitive components forming a log-periodically scaled structure; and
- a low-pass filter structure being located between said input port and one of said at least two output ports.

20. The multiplexer of claim 19 wherein each of said output ports is connected to a channelizer filter including one output port having series-resonant-type driving-point impedance characteristics in the vicinity of channel passband frequencies.

21. The multiplexer of claim 19 wherein each of said output ports comprises a port of a circuit comprising a capacitively end-coupled transmission line resonator section.

22. The multiplexer of claim 21 wherein said capacitively end-coupled transmission line filter includes at least one transmission line resonator section.

23. The multiplexer of claim 21 wherein said capacitively end-coupled transmission line filter further comprises a means for moving unwanted parasitic passbands to higher frequencies away from the principal passband of said transmission line filter.

24. The multiplexer of claim 23 wherein said transmission line resonator section comprises a low-impedance input section, a high-impedance center section, and a low-impedance output section.

25. The multiplexer of claim 21 wherein said transmission line resonator section comprises a low-high-low characteristic impedance profile.

26. The multiplexer of claim 22 wherein there are two transmission line resonator sections.

27. A multiport microwave frequency multiplexer comprising:

a logarithmic periodic structure, said structure comprising:

a trunk line; and a plurality of channelizer filters;

wherein said trunk line further comprises at least one frequency sensitive filter component.

28. A method of constructing a microwave multiplexer circuit having an input and at least one output, comprising the steps of:

selecting an output frequency band for each output port;

selecting components of said multiplexer circuit so as to form an assembly of log-periodically scaled subcircuits, with one port of each such subcircuit being an output port;

placing a capacitively end-coupled transmission line channelizer filter in each multiplexer subcircuit;

incorporating in each of said subcircuits, sections which are connected to said channelizer filters; and placing low-pass filter sections between each subcircuit, and log-periodically scaling components of said low-pass filter sections.

29. The method of constructing a microwave multiplexer of claim 28 wherein a barbell transmission line segment is provided as a means for shifting a parasitic passband.

* * * * *